US012745287B2

(12) United States Patent
Zhang et al.

(10) Patent No.: US 12,745,287 B2
(45) Date of Patent: Sep. 22, 2026

(54) METHODS AND APPARATUSES FOR ASSOCIATION BETWEEN RANDOM ACCESS CHANNEL OCCASIONS

(71) Applicant: Lenovo (Beijing) Limited, Beijing (CN)

(72) Inventors: Yuantao Zhang, Beijing (CN); Hongmei Liu, Beijing (CN); Zhi Yan, Beijing (CN); Yingying Li, Beijing (CN); Haiming Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 632 days.

(21) Appl. No.: 18/265,528

(22) PCT Filed: Dec. 8, 2020

(86) PCT No.: PCT/CN2020/134526
§ 371 (c)(1),
(2) Date: Jun. 6, 2023

(87) PCT Pub. No.: WO2022/120568
PCT Pub. Date: Jun. 16, 2022

(65) Prior Publication Data

US 2024/0121829 A1 Apr. 11, 2024

(51) Int. Cl.
*H04W 74/0833* (2024.01)
*H04W 74/00* (2009.01)

(52) U.S. Cl.
CPC ..... *H04W 74/0833* (2013.01); *H04W 74/006* (2013.01)

(58) Field of Classification Search
None
See application file for complete search history.

(56) References Cited

U.S. PATENT DOCUMENTS 12,177,910 B2 * 12/2024 Li ..................... H04W 74/0833
12,192,999 B2 * 1/2025 Liu ..................... H04L 5/0048
2021/0250936 A1 * 8/2021 Liu ..................... H04L 5/0048
(Continued)

FOREIGN PATENT DOCUMENTS

CN 111567130 A 8/2020
CN 112040558 A 12/2020
WO 2018106067 A1 6/2018

OTHER PUBLICATIONS

Huawei , et al., “RACH Procedures and Resource Configuration”, 3GPP TSG RAN WG1 Meeting #88, R1-1701724, Athens, Greece [retrieved May 23, 2023]. Retrieved from the Internet <https://www.3gpp.org/ftp/tsg_ran/WG1_RL1/TSGR1_88/Docs>., Feb. 2017, 7 Pages.
(Continued)

*Primary Examiner* — Faiyazkhan Ghafoerkhan
(74) *Attorney, Agent, or Firm* — FIG. 1 Patents

(57) ABSTRACT

Disclosed are methods and apparatuses for small data transmission in random access. One embodiment of the subject application provides a method performed by a user equipment, including determining an association among a first random access channel (RACH) occasion (RO), a preamble, and a second RO, and receiving an random access response (RAR) in an Msg2 at least according to the second RO in response to transmitting the preamble in the first RO.

20 Claims, 8 Drawing Sheets

910 determining a first RO and a preamble for associating with a second RO 920 transmitting an RAR in an Msg2 at least according to the second RO in response to receiving the preamble in the first RO

(56) References Cited

U.S. PATENT DOCUMENTS

| | | | | |
|---|---|---|---|---|
| 2021/0329691 | A1* | 10/2021 | Sun | H04W 74/002 |
| 2022/0046724 | A1* | 2/2022 | Maso | H04W 74/0891 |
| 2023/0015843 | A1* | 1/2023 | Li | H04W 74/0891 |
| 2023/0209606 | A1* | 6/2023 | Zhang | H04W 74/006<br>370/329 |
| 2024/0121829 | A1* | 4/2024 | Zhang | H04W 74/0833 |

OTHER PUBLICATIONS

Nokia , et al., "NR 4-step RACH procedure", 3GPP TSG RAN WG1 NR Ad-Hoc#2, R1-1710892, Qingdao, China [retrieved May 23, 2023]. Retrieved from the Internet <https://www.3gpp.org/ftp/tsg_ran/WG1_RL1/TSGR1_AH/NR_AH_1706/Docs>., Jun. 2017, 9 Pages.

PCT/CN2020/134526 , "International Preliminary Report on Patentability", PCT Application No. PCT/CN2020/134526, Jun. 22, 2023, 5 pages.

PCT/CN2020/134526 , "International Search Report and Written Opinion", PCT Application No. PCT/CN2020/134526, Sep. 7, 2021, 6 pages.

* cited by examiner

METHODS AND APPARATUSES FOR ASSOCIATION BETWEEN RANDOM ACCESS CHANNEL OCCASIONS

TECHNICAL FIELD

The present disclosure relates to methods and apparatuses for associations between random access channel (RACH) occasions (ROs).

BACKGROUND OF THE INVENTION

In 3GPP (3rd Generation Partnership Project), there may be various types of user equipments (UEs) for different application scenarios and different application purposes, such as coverage enhanced UEs, reduced capability (RedCap) UEs, legacy UEs (e.g., enhanced mobile broadband (eMBB) and ultra-reliable low latency communication (URLLC) UEs), and etc.

For a 4-step random access (RA) procedure, in step 1, a user equipment (UE) transmits a preamble in an Msg1 to a base station (BS); in step 2: the BS transmits a random-access response (RAR) in Msg2 to the UE; and in steps 3 and 4, the UE and the BS exchange of messages (uplink Msg3 and subsequent downlink Msg4) with the aim of resolving potential collisions due to simultaneous transmissions of the same preamble from multiple devices within the cell.

Specifically, in step 1, a preamble transmission takes place in a configurable subset of slots that repeats itself every RACH configuration period. Furthermore, within these slots, there may be one or multiple frequency domain ROs covering multiple consecutive resource blocks. The ROs are associated with synchronization signal blocks (SSBs) that may be transmitted with different beams. The SSBs consists of a primary synchronization signal/secondary synchronization signal (PSS/SSS) and a physical broadcast channel (PBCH) for the UE to synchronize to a downlink (DL), obtains the cell ID, and acquires the system information. For each UE, typically it measures the channel status of each SSB, selects the one with good channel quality, and transmits preamble in a RO that is associated with the selected beam.

In step 2, the RAR is included in a medium access control (MAC) sub packet data unit (subPDU) in the Msg2, indicating reception of the preamble and providing a time-alignment (TA) command adjusting the transmission timing of the UE based on the timing of the received preamble. The RAR also includes a random access radio network temporary identity (RA-RNTI) for scrambling the downlink control information (DCI) for Msg3/Msg4 (re-)transmission. The RA-RNTI is implicitly determined by the index of the RO in the time and frequency domain. The UE receive the RAR within an RA response window, which starts after the UE transmits Msg1.

Once the RA procedure is completed, the UE is in connected state and network-device communication can continue using normal dedicated transmission.

SUMMARY

In some embodiments, a method performed by a UE includes determining an association between a first RO, a preamble, and a second RO and receiving an RAR in an Msg2 at least according to the second RO in response to transmitting the preamble in the first RO.

In some embodiments, determining the association between the first RO, the preamble, and the second RO further includes determining an association between the first RO and the second RO at least according to a SSB.

In some embodiments, the first RO is configured for a first type of UEs, the second RO is configured for a second type of UEs, the UE belongs to the first type of UEs, and the second RO is not earlier than the first RO in a time domain.

In some embodiments, the Msg2 is scheduled by a Downlink Control Information (DCI) with a scrambling sequence at least according to the second RO.

In some embodiments, the second RO is an RO configured with a lowest or highest or predetermined or configured frequency domain position and a lowest time domain position among at least one RO associated with the SSB among at least one RO for the second type of UE.

In some embodiments, receiving the RAR in the Msg2 at least according the second RO further includes determining an RA response window for the Msg2 at least according to the second RO.

In some embodiments, determining the association among the first RO, the preamble, and the second RO further includes determining the association among the first RO, the preamble, and the second RO periodically in an RO association period, and the RO association period is configured by the UE, or a BS, or a network, or is predefined.

In some embodiments, the RO association period is determined at least according to a first period and/or a second period, and the first period is for associating the first RO with the SSB, the second period is for associating the second RO with the SSB, and the first period is configured by the UE, or a BS, or a network, or is predefined.

In some embodiments, the first period is equal to the second period multiplied with a first factor, and the first factor is a positive number and is configured by the UE or a BS or is predefined.

In some embodiments, the RO association period is determined as a larger period between the first period and the second period and multiplied with a second factor, the second factor is a positive number and is configured by the UE or a BS or is predefined.

In some embodiments, a MAC subPDU for the RAR is placed after a last MAC subPDU for the second type of UEs in the Msg2 and is treated as padding bits by the second type of UEs.

In some embodiments, a MAC subPDU for the RAR includes an indicator indicating that the MAC subPDU for the RAR is for the first type of UEs, and the MAC subPDU is not identified by the second type of UEs.

In some embodiments, a method performed by a BS includes determining an association among a first RO, a preamble, and a second RO and transmitting an RAR in an Msg2 at least according to the second RO in response to receiving the preamble in the first RO from a UE.

In some embodiments, determining the first RO for associating with the second RO further includes determining the first RO for associating with the second RO at least according to a SSB.

In some embodiments, the first RO is configured for a first type of UEs, the second RO is configured for a second type of UEs, the UE belongs to the second type of UEs, and the second RO is not earlier than the first RO in a time domain.

In some embodiments, the method further includes scheduling the Msg2 by a DCI with a scrambling sequence at least according to the second RO.

In some embodiments, the second RO is an RO configured with a lowest or highest or predetermined or configured frequency domain position and a lowest time domain position among at least one RO associated with the SSB among at least one RO for the second type of UE.

In some embodiments, determining the association among the first RO, the preamble, and the second RO further includes determining the association among the first RO, the preamble, and the second RO periodically in an RO association period, and the RO association period is configured by the UE, or the BS, or a network, or is predefined.

In some embodiments, the RO association period is determined at least according to a first period and/or a second period, and the first period is for associating the first RO with the SSB, the second period is for associating the second RO with the SSB, and the first period is configured by the UE, or the BS, or a network, or is predefined.

In some embodiments, the first period is equal to the second period multiplied with a first factor, and the first factor is a positive number and is configured by the UE or a BS or is predefined.

In some embodiments, the RO association period is determined as a larger period between the first period and the second period and multiplied with a second factor, and the second factor is a positive number and is configured by the UE or a base station (BS) or is predefined.

In some embodiments, the method further includes placing a MAC subPDU for the RAR after a last MAC subPDU for the second type of UEs in the Msg2, and the MAC subPDU for the RAR is treated as padding bits by the second type of UEs.

In some embodiments, the method further includes placing an indicator in a MAC subPDU for the RAR, and the indicator indicates that the MAC subPDU for the RAR is for the first type of UEs, and is not identified by the second type of UEs.

In some embodiments, an apparatus includes a non-transitory computer-readable medium having stored thereon computer-executable instructions, a receiving circuitry, a transmitting circuitry, and a processor coupled to the non-transitory computer-readable medium, the receiving circuitry and the transmitting circuitry, and the computer-executable instructions cause the processor to implement a method. The method includes determining an association among a first RO, a preamble, and a second RO and receiving an RAR in an Msg2 at least according to the second RO in response to transmitting the preamble in the first RO.

In some embodiments, an apparatus includes a non-transitory computer-readable medium having stored thereon computer-executable instructions, a receiving circuitry, a transmitting circuitry, and a processor coupled to the non-transitory computer-readable medium, the receiving circuitry and the transmitting circuitry, and the computer-executable instructions cause the processor to implement a method. The method includes determining an association among a first RO, a preamble, and a second RO and transmitting an RAR in an Msg2 at least according to the second RO in response to receiving the preamble in the first RO from a UE.

BRIEF DESCRIPTION OF THE DRAWINGS

Some example embodiments will now be described, by way of non-limiting examples, with reference to the accompanying drawings.

DETAILED DESCRIPTION

The detailed description of the appended drawings is intended as a description of the preferred embodiments of the present invention, and is not intended to represent the only form in which the present invention may be practiced. It should be understood that the same or equivalent functions may be accomplished by different embodiments that are intended to be encompassed within the spirit and scope of the present invention.

Reference will now be made in detail to some methods, embodiments, and apparatuses of the present disclosure, examples of which are illustrated in the accompanying drawings. To facilitate understanding, these methods, embodiments, and apparatuses are provided under specific network architecture and new service scenarios, such as 3GPP 5G and so on. It is contemplated that along with developments of network architectures and new service scenarios, all embodiments in the present application are also applicable to similar technical problems, and moreover, the terminologies recited in the present application may change, which should not affect the principle of the present application.

The present disclosure relates to an association of ROs, especially relates to an association of ROs of different type of UEs.

As have mentioned, there may be multiple types of UEs. Currently, the ROs used by one type of UEs may be separated from the ROs used for the other type of UEs. One advantage is that UEs using their own ROs may be identified by the BS earlier, such that the BS may perform e.g., access control, link adaption for RA earlier. Another advantage is to perform congestion control to avoid high preamble collision.

However, the ROs separation between different types of UEs may lead to Msg2 separation between different types of UEs, this results in higher Msg2 overhead, including physical downlink control channel (PDCCH) overhead and physical downlink shared Channel (PDSCH) overhead. Furthermore, more PDCCH means higher PDCCH blocking, especially considering the high aggregation levels used for PDCCH transmission for Msg2 for certain type of UEs (e.g., the RedCap UEs). This may in turn deteriorate the RA performance of other type of UEs (e.g., legacy eMBB or URLLC UEs).

Figure 1:
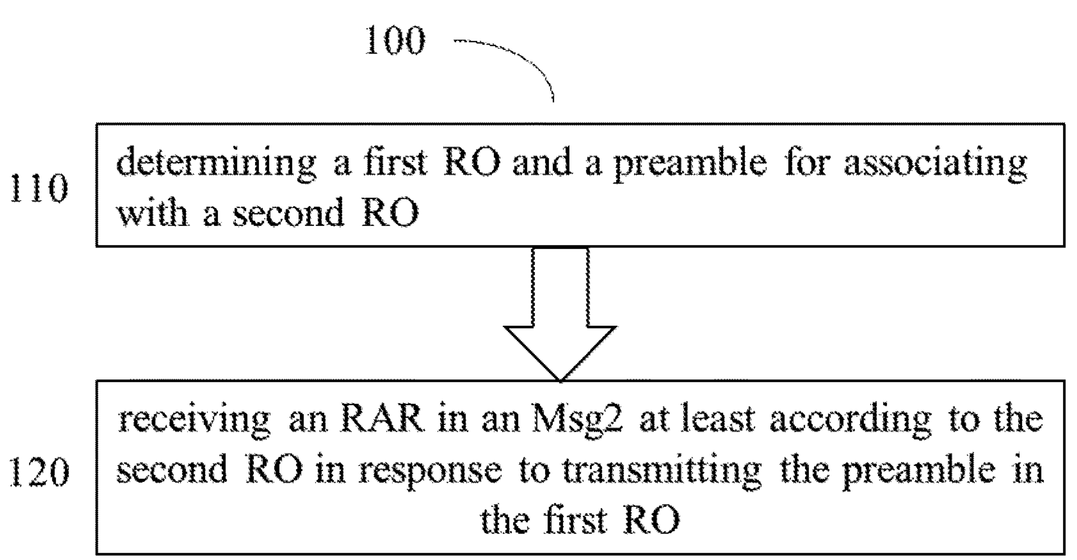
FIG. 1 illustrates an exemplary method according to some embodiments of the present disclosure.

FIG. 1 shows an exemplarily method 100 performed by a UE according to some embodiments of the present disclosure.

As shown in FIG. 1, the method 100 at least includes an operation 110 and an operation 120. The operation 110 illustrates determining an association among a first RO, a preamble, and a second RO. The operation 120 illustrates receiving an RAR in an Msg2 at least according to the second RO in response to transmitting the preamble in the first RO.

In some embodiments, before or during transmitting the preamble in the first RO, the association among the first RO, the preamble, and the second RO is determined. In some embodiments, after transmitting the preamble in the first RO and before receiving the Msg2, the association among the first RO, the preamble, and the second RO is determined.

In some embodiments, the determination of the association among the first RO, the preamble, and the second RO may be decomposed into the determination of the association between the first RO and the preamble, and the determination of the association between the first RO and the second RO.

In some embodiments, the first RO is configured for a first type of UEs, the second RO is configured for a second type of UEs, the UE belongs to the first type of UEs, and the second RO is not earlier than the first RO in a time domain. For example, the first type of UEs can be RedCap UEs or coverage enhanced UEs, and the second type of UEs can be legacy eMBB or URLLC UEs.

In some embodiments, the ROs for the first type of UEs (i.e., the first type of ROs) are separated from the ROs for the second type of UEs (i.e., the second type of ROs). In other words, the first type of ROs is not used by the second type of UEs, and vice versa.

In some embodiments, the determination of the association between the first RO and the second RO is performed at least according to an SSB. The SSBs consists of a primary synchronization signal/secondary synchronization signal (PSS/SSS) and a physical broadcast channel (PBCH) for the UE to synchronize to the DL, obtains the cell ID, and acquires the system information. The SSBs are shared by the first type of UEs and the second type of UEs. In other words, the first type of ROs may be associated with the SSBs, and the second type of ROs may be associated with the SSBs as well.

In some embodiments, the first RO and the second RO may be associated with the same SSB.

In some embodiments, in the operation 110, the UE measures the channel status of each SSB, select the one SSB with good channel quality. Based on the association between the SSB and the first type of ROs, the association between the SSB and the second type of ROs, the association between the preamble and the first type of ROs, the UE determines the association among the first RO, the preamble, and the second RO.

The association between a type of ROs (i.e., ROs for a type of UEs) and SSBs could be 1-to-1, 1-to-N, or N-to-1 depending on network configuration, wherein N is a positive integer greater than 1.

FIG. 2*a*, FIG. 2*b*, and FIG. 2*c* illustrate examples for associations between the second type of ROs and SSBs.

Figure 2:
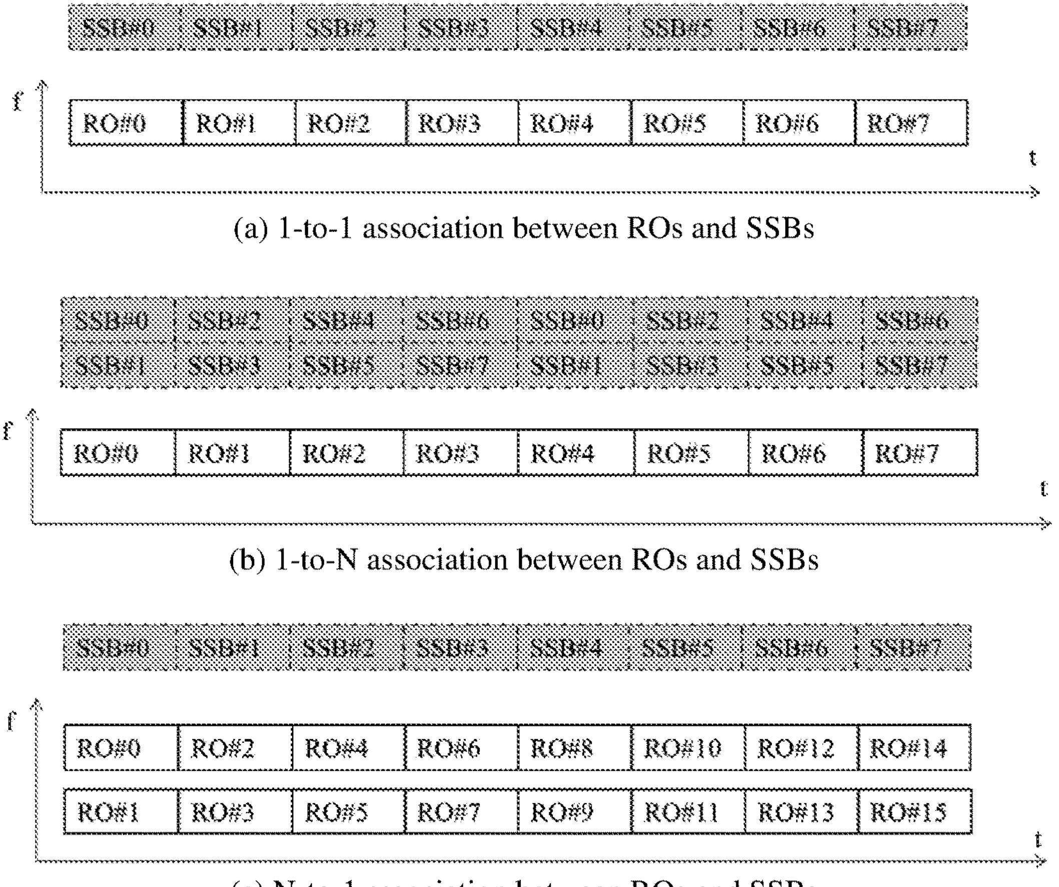
FIG. 2 (including 2a, 2b, and 2c) illustrates some exemplary associations between ROs and SSBs.

As shown in FIG. 2, there is one RO in frequency domain for each SSB in FIG. 2*a* and FIG. 2*b*, and there are 2 ROs in frequency domain for each SSB in FIG. 2*c*. The integer N is assumed to be 2 in FIG. 2*b* and FIG. 2*c*.

In some embodiments, in the operation 110, multiple ROs in the second type of ROs are associated with the SSB, which requires one of them to be determined as the second RO.

In some embodiments, the second RO is an RO configured with a lowest or highest or predetermined or configured (configured by the UE or the BS) frequency domain position and a lowest time domain position among at least one second type of RO associated with the SSB.

Referring to FIG. 2*b*, for example, it illustrates the associations between the SSBs and the second type of ROs. Supposing SSB #2 is selected to be for the preamble transmission, as shown in FIG. 2*b*, RO #1 and RO #5 are ROs associated with SSB #2 among the second type of ROs for the second type of UEs. The RO configured with the lowest frequency domain position and the lowest time domain position among the at least one second type of RO associated with SSB #2 is RO #1. RO #1 may be determined to be the second RO for associating with the first RO.

Referring to FIG. 2*c*, for example, it illustrates the associations between the SSBs and the second type of ROs. Supposing SSB #2 is selected to be for the preamble transmission, as shown in FIG. 2*c*, RO #4 and RO #5 are ROs associated with SSB #2 among the second type of ROs for the second type of UEs. The RO configured with the highest frequency domain position and the lowest time domain position among the at least one second type of RO associated with SSB #2 is RO #5. RO #5 may be determined to be the second RO for associating with the first RO.

In some embodiments, the association between the SSBs and the ROs are performed periodically.

In some embodiments, in the operation 110, the determination of the first RO for associating with the second RO at least according to the SSB is performed periodically in a RO association period. In some embodiments, the RO association period can be configured by the UE, or a BS, or a network, or is predefined.

In some embodiments, the RO association period is determined at least according to a first period and/or a second period. The first period is for associating the first RO with the SSB, and the second period is for associating the second RO with the SSB. In some embodiments, the first period can be configured by the UE, or a BS, or a network, or is predefined.

In some embodiments, the first period is equal to the second period multiplied with a first factor, and the first factor is a positive number. In some embodiments, the first factor can be configured by the UE or a BS or can be predefined.

In some embodiments, the RO association period is determined as a larger period between the first period and the second period and multiplied with a second factor, and the second factor is a positive number. In some embodiments, the second factor can be configured by the UE or a BS or can be predefined.

As aforementioned, in the operation 110, there may be multiple ROs in the second type of ROs associated with the SSB, and thus one of them needs to be determined as the second RO.

FIGS. 3-7 illustrate some examples about determining the association between the first RO and the second RO at least according to a SSB.

The second RO is not earlier than the first RO in the time domain.

Furthermore, if there are at least one second type RO in the frequency domain that are associated with the SSB, then the second type RO configured with the lowest (or highest) or a predefined/configured frequency domain position and with the lowest time domain position is selected for the association. In other words, the second RO is the nearest RO to the first RO among the second type of ROs that are not earlier than the first RO in the time domain and are associated with the same SSB; and if there are at least one second type RO nearest to the first RO, then the second type RO configured with the lowest (or highest) or a predefined/configured frequency domain position among the at least one second type RO is determined to be the second RO.

Figure 3:
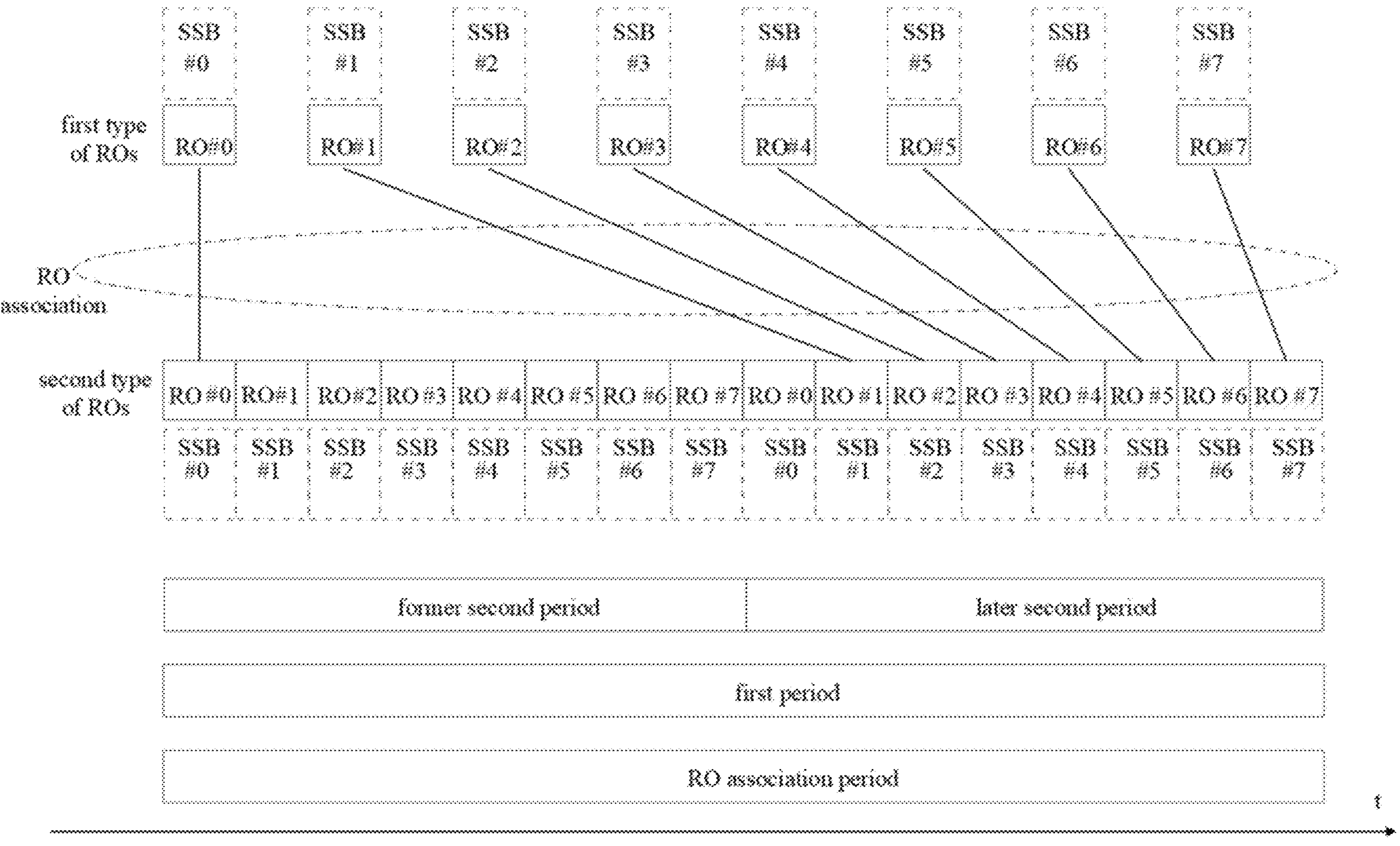
FIG. 3 illustrates an example about associating the first type of ROs and the second type of ROs.

FIG. 3 illustrates an example about associating the first type of ROs and the second type of ROs at least according to SSBs. As shown in FIG. 3, each RO is associated with one SSB, each SSB is associated with one of the first type of ROs and one of the second type of ROs in the frequency domain, and the ROs configured for the first type of UEs are sparser than the ROs configured for the second type of UEs. In each first period, the first type RO #0 to RO #7 are associated with SSBs SSB #0 to SSB #7 respectively; and in each second period, the second type RO #0 to RO #7 are associated with SSBs SSB #0 to SSB #7 respectively. The first factor is 2, and the second factor is 1, i.e., the first period for the first type of UEs is double of the second period for the second type of UEs, and the RO association period is equal to the first period.

In this example, the second RO is not earlier than the associated first RO in the time domain and is configured with the lowest time domain position among at least one second RO associated with the SSB. The first type RO #0 in the first period is associated with the second type RO #0 in the former second period; and the first type RO #1 to RO #7 in the first period are associated with the second type RO #1 to RO #7 in the later second period.

The first type RO #1 to RO #7 in the first period are not associated with the second type RO #1 to RO #7 in the former second period, because each of the second type RO #1 to RO #7 in the former second period is earlier than the corresponding one of the first type RO #1 to RO #7 in the first period respectively.

Figure 4:
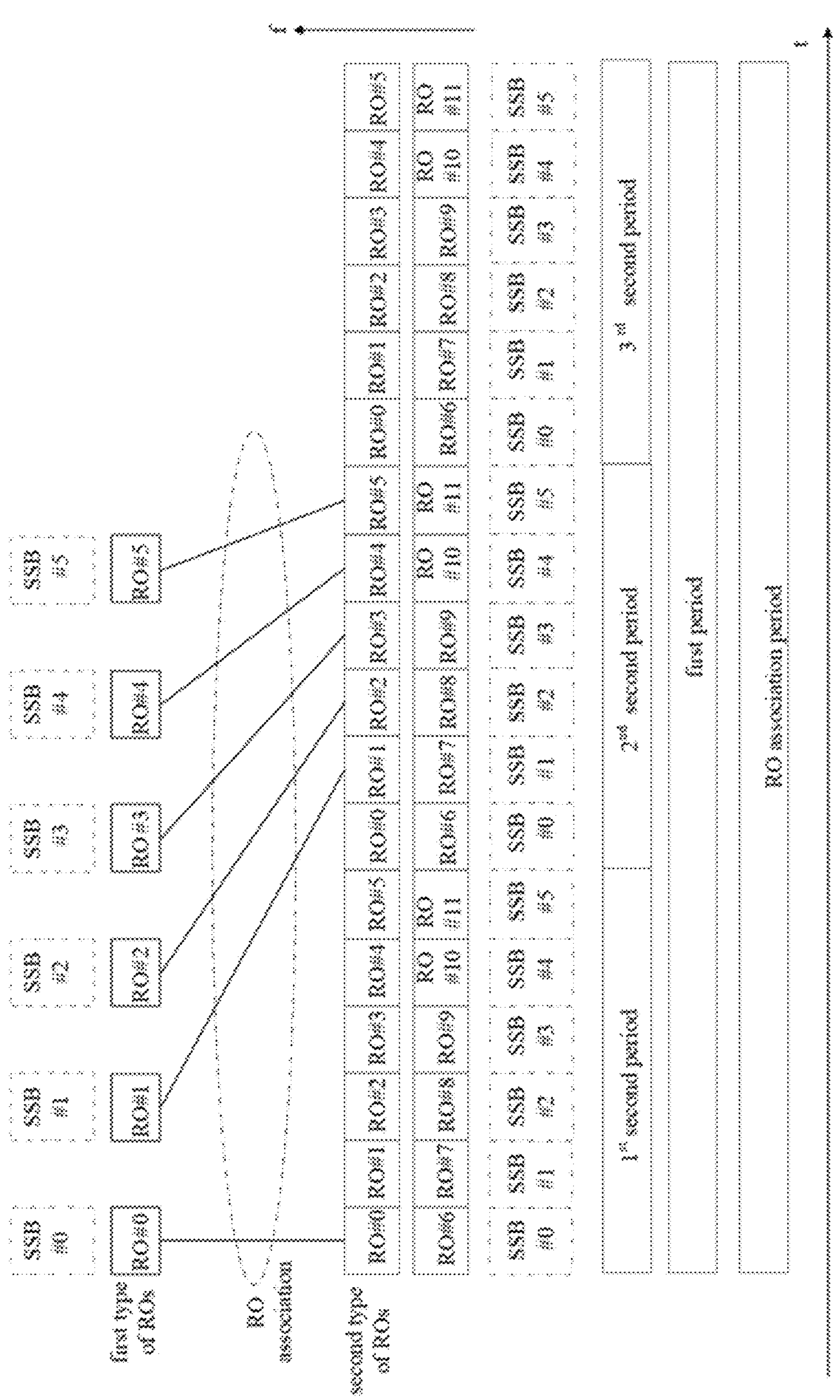
FIG. 4 illustrates an example about associating the first type of ROs and the second type of ROs.

FIG. 4 illustrates an example about associating the first type of ROs and the second type of ROs at least according to SSBs. In this example, the first factor is 3, and the second factor is 1. The second RO is not earlier than the first RO in the time domain. Furthermore, there are two second type ROs in the frequency domain that are associated with each SSB. In this example, the second RO is determined to be the second type RO configured with the higher frequency domain position and with the lowest time domain position. Therefore, the first type RO #0 in the first period is associated with the second type RO #0 in the $1^{st}$ second period; and the first type RO #1 to RO #5 in the first period are associated with the second type RO #1 to RO #5 in the $2^{nd}$ second period. The first type ROs in the first period are not associated with the second type ROs in the 3 rd second period.

In some cases, each first type RO is associated with multiple SSBs. Accordingly, the first RO may be associated with one of a set of nearest second type ROs depending on which SSB is selected for transmitting the preamble. In other words, if the first RO and the SSB are determined, which one of a set of nearest second type ROs is determined to be the second RO is depending on which SSB is determined for transmitting the preamble. From system level, the preambles that are associated with the same SSB in a first type RO are associated with a same second type RO.

Figure 5:
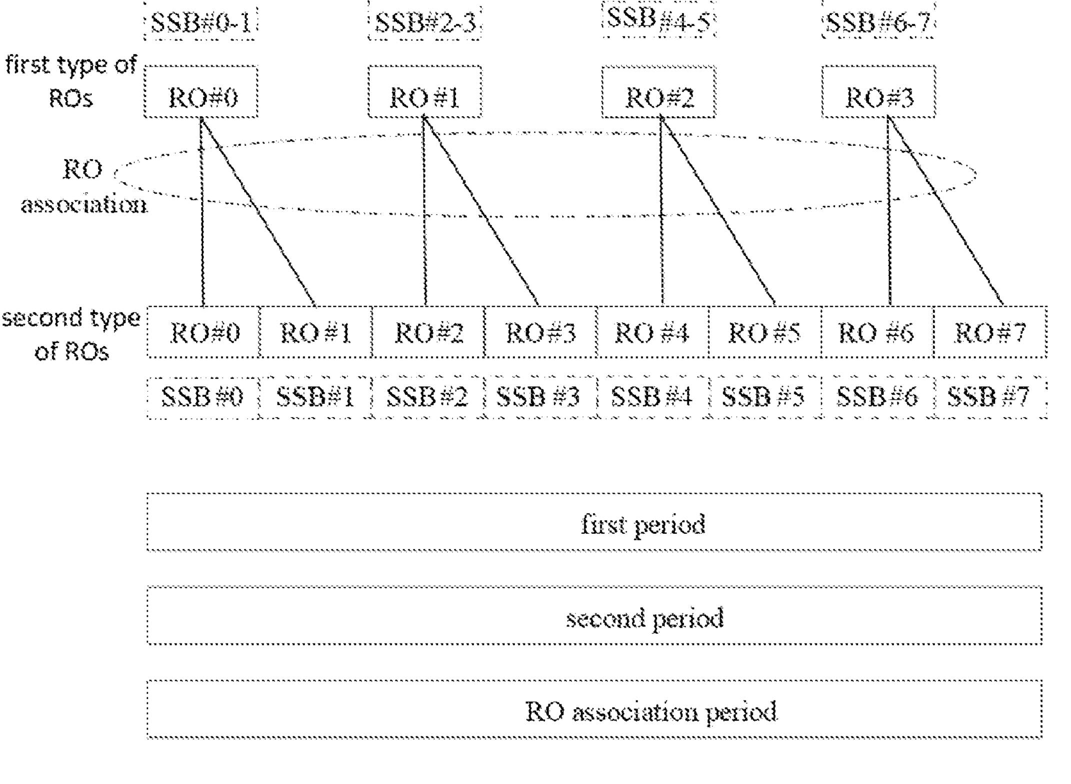
FIG. 5 illustrates an example about associating the first type of ROs and the second type of ROs.

FIG. 5 illustrates an example about associating the first type of ROs and the second type of ROs at least according to SSBs. As shown in FIG. 5, the first factor is 1, and the second factor is 1; i.e., the lengths of the first period, the second period, and the RO association period are the same. The first type of ROs are configured to be sparser than the second type of ROs in time domain. In each first period, each of the first type RO #0 to RO #3 is associated with two SSBs respectively; in each second period, each of the second type RO #0 to RO #7 is associated with SSBs SSB #0 to SSB #7 respectively; and each SSB is associated with one first type RO and one second type RO in the frequency domain.

In this example, in the RO association period, the first type RO #0 is associated with the second type RO #0 and RO #1; and depending on which one of SSB #0 and SSB #1 is selected for the preamble transmission, the associated second type RO is determined accordingly. The first type RO #1 is associated with the second type RO #2 and RO #3; and depending on which one of SSB #2 and SSB #3 is selected for the preamble transmission, the associated second type RO is determined accordingly. The first type RO #2 is associated with the second type RO #4 and RO #5; and depending on which one of SSB #4 and SSB #5 is selected for the preamble transmission, the associated second type RO is determined accordingly. The first type RO #3 is associated with the second type RO #6 and RO #7; and depending on which one of SSB #6 and SSB #7 is selected for the preamble transmission, the associated second type RO is determined accordingly.

For example, the UE determines to transmit a preamble in the first type RO #0 using a beam associated with SSB #1, then the first RO is the first type RO #0, and the second RO is the second type RO #1. After transmitting the preamble in the first RO, the UE may start to detect Msg2 at least according to the second type RO #1. In other words, the UE may start to detect Msg2 in a RA-ResponseWindow, which is determined by the second type RO #1. In more detail, the RA-ResponseWindow for the UE that transmits a preamble in the first type RO #0 starts after a certain period of the associated second type RO #1. Besides, the RA-RNTI for Msg2 PDCCH is determined by the time and frequency index of the associated the second type RO #1.

In some cases, in a first period, each SSB is associated with a set of first type ROs, the set of first type ROs includes at least one first type RO; i.e., multiple first type of ROs may be associated with one second type of RO. In such cases, as one embodiment, only the earliest first type RO of the set of first type ROs in the time domain is used for the preamble transmission, while the others are not used for the preamble transmission. If there are at least one earliest first type RO, then the earliest first type RO with the lowest, or the highest, or the predefined, or the configured frequency position is used for the preamble transmission, while the others are not used for the preamble transmission. As another embodiment, the association is maintained for all ROs.

Figure 6:
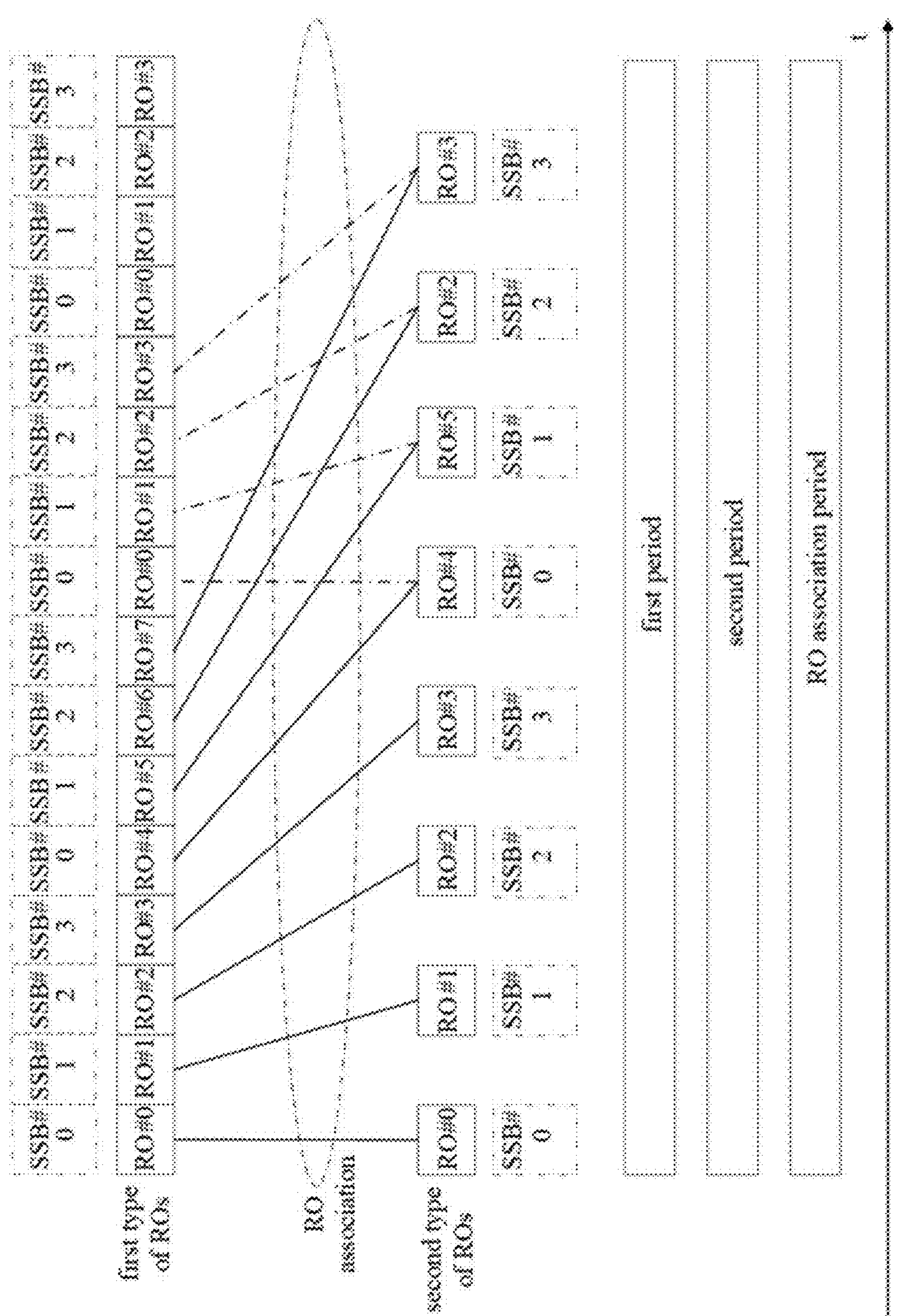
FIG. 6 illustrates an example about associating the first type of ROs and the second type of ROs.

FIG. 6 illustrates an example about associating the first type of ROs and the second type of ROs at least according to SSBs.

As shown in FIG. 6, the first factor is 1, and the second factor is 1. The lengths of the first period, the second period, and the RO association period are the same. The first type of ROs is configured to be denser than the second type of ROs.

In the RO association period, each SSB is associated with one first type RO at different time point, each SSB is associated with one second type RO at different time point, while multiple first type ROs are associated with the same SSB at different time point, and multiple second type ROs are associated with the same SSB at different time point. For example, the first type RO #4 and RO #0 are associated with SSB #0 at different time point, the second type RO #0 and RO #4 are associated with SSB #0 at different time point.

According to the present disclosure, based on the same SSB, in the RO period, second type RO #4 is associated with first type RO #4 and the first type RO #0 according to SSB #0, second type RO #5 is associated with first type RO #5 and first type RO #1 according to SSB #1, second type RO #2 is associated with first type RO #6 and first type RO #2 according to SSB #2, and second type RO #3 is associated with first type RO #7 and first type RO #3 according to SSB #3. As proposed, the association between second type RO #4 and first type RO #4, the association between second RO #5 and first RO #5, the association between second RO #2 and first RO #6, and the association between second RO #3 and first RO #7 are maintained for a preamble transmission, while the association between second type RO #4 and first type RO #0, the association between second type RO #5 and first type RO #1, the association between second type RO #2 and first type RO #2, and the association between second type RO #3 and first type RO #3 are dropped and these first ROs are not used for a preamble transmission from a first type UE.

As one embodiment, the first type ROs that are not associated with the second type of ROs in an RO association period are not used for the preamble transmission. As another embodiment, the first type ROs that are not associated with the second type of ROs in an RO association period are associated with the second type of ROs in the next RO association period. For example in FIG. 6, the four first type ROs (RO #0, RO #1, RO #2, and RO #3) at the end of the RO association period are associating with the second type of ROs respectively in the next RO association period that are not shown in FIG. 6.

In some cases, each second type RO may be associated with at least one SSB.

Figure 7:
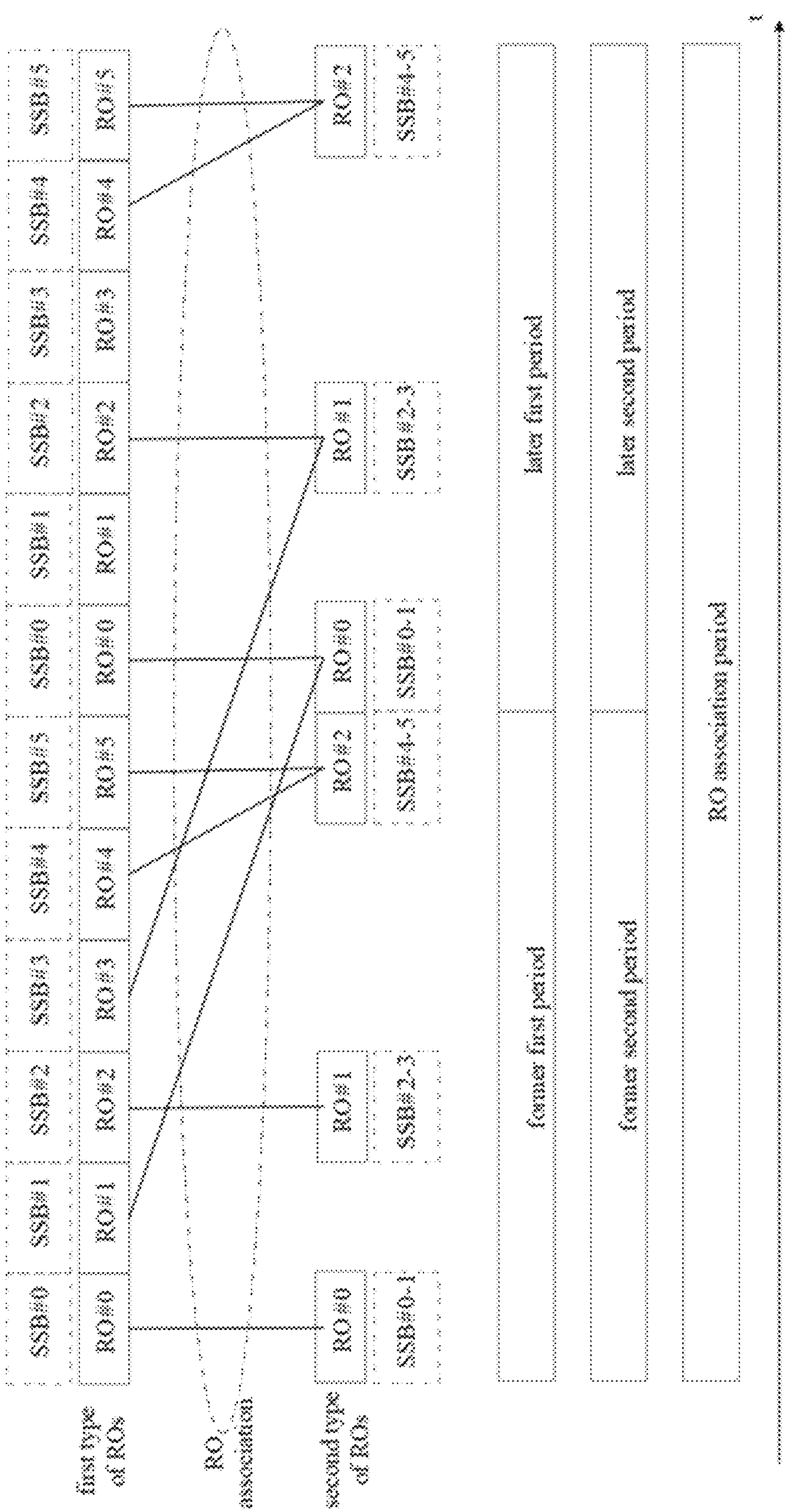
FIG. 7 illustrates an example about associating the first type of ROs and the second type of ROs.

FIG. 7 illustrates an example about associating the first type of ROs and the second type of ROs at least according to SSBs.

As shown in FIG. 7, each of the first type of ROs is associated with one SSB, each of the second type of ROs is associated with two SSBs, and each SSB is associated with one of the first type of ROs and one of the second type of ROs in a frequency domain. The first type of ROs are configured to be denser than the second type of ROs. The first factor is 1, and the second factor is 2. The length of the RO association period is twice of the length of the first period or the second period.

The associations between the first type ROs and the second type ROs are shown in FIG. 7, which may be used for the preamble transmission.

For example, the SSB for transmitting the preamble is SSB #1, the first RO is the first type RO #1 in the former first period, then the second RO is the second type RO #0 in the later second period.

For example, the SSB for transmitting the preamble is SSB #4, the first RO is the first type RO #4 in the former first period, then the second RO is the second type RO #2 in the former second period.

FIGS. 3-7 illustrates several examples about determining the association between the first RO and the second RO at least according to a SSB. However, the determination of the association between the first RO and the second RO is not limited to these examples. Any method that does not violate the spirit of the present disclosure may be used for determination of the association between the first RO and the second RO at least according to a SSB.

Referring again to FIG. 1, in some embodiments, in the operation 120, the Msg2 is scheduled by a DCI with a scrambling sequence at least according to the second RO, more specifically, according to the index of the second RO in the time domain and in the frequency domain.

According to the present application, the first type of UEs and the second type of UEs share the same Msg2. In other words, an Msg2 may contain RARs for the first type of UEs and RARs for the second type of UEs.

In some embodiments, the operation 120 further includes determining an RA response window for the Msg2 at least according to the second RO. In some embodiments, the RA-RNTI for the Msg2 PDCCH is determined by the time and frequency index of the second RO.

In some embodiments, in the operation 120, a MAC subPDU including the containing the RAR is placed after a last MAC subPDU for the second type of UEs in the Msg2 and is treated as padding bits by the second type of UEs.

In some embodiments, the MAC subPDUs for the first type of UEs are placed after the last MAC subPDU for the second type of UEs in the Msg2 and are treated as padding bits by the second type of UEs.

Figure 8:
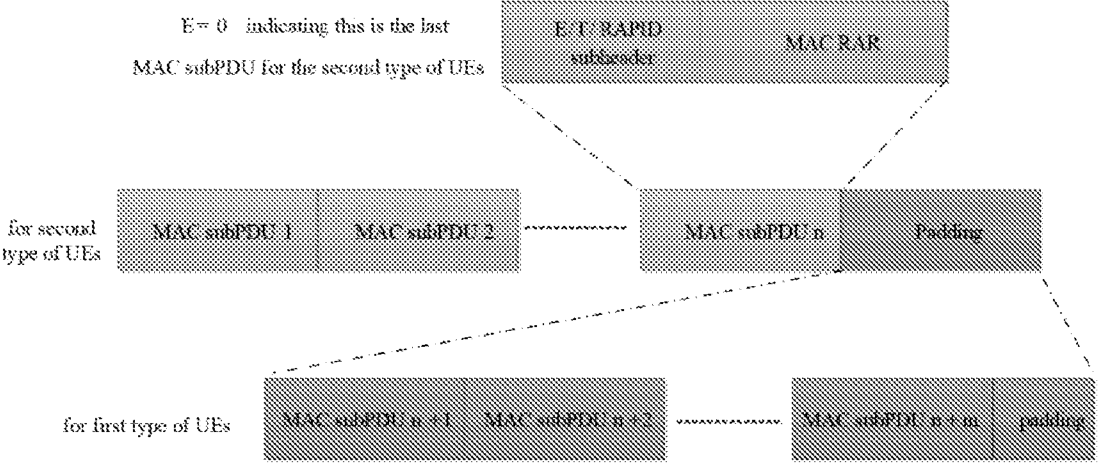
FIG. 8 illustrates an exemplary structure of Msg2 according to some embodiments of the present disclosure.

FIG. 8 illustrates an exemplary structure of Msg2 according to some embodiments of the present disclosure. In this example, the MAC subPDU for the second type of UEs contains a bit E. If the bit E is 0, it indicates that the MAC subPDU is the last MAC subPDU for the second type of UEs in the Msg2. The bits after the last MAC subPDU for the second type of UEs in the Msg2 are treated as padding bits by the second type of UEs. These bits may be used as MAC subPDUs for the first type of UEs according to the present disclosure.

In some embodiments, a MAC subPDU for the RAR of the first type of UEs may be designed to be in a new form so as to be unable to be identified by the second type of UEs. For example, the MAC subPDU for the RAR of the first type of UEs may include an indicator indicating that the MAC subPDU for the RAR is for the first type of UEs, and the MAC subPDU is not identified by the second type of UEs.

By these two ways, the advantage is that even the first type of UEs and the second type of UEs share the same Msg2, the RARs of the first type of UEs may not affect the reception of the RARs by the second type of UEs.

The aforementioned methods, implements, and examples are performed by a first type UE for determining a second type RO for sharing the same Msg2 with the second type of UEs. A BS may execute corresponding methods, implements, and examples to determine a second type RO for transmitting an RAR in an Msg2 to a first type UE.

Figure 9:
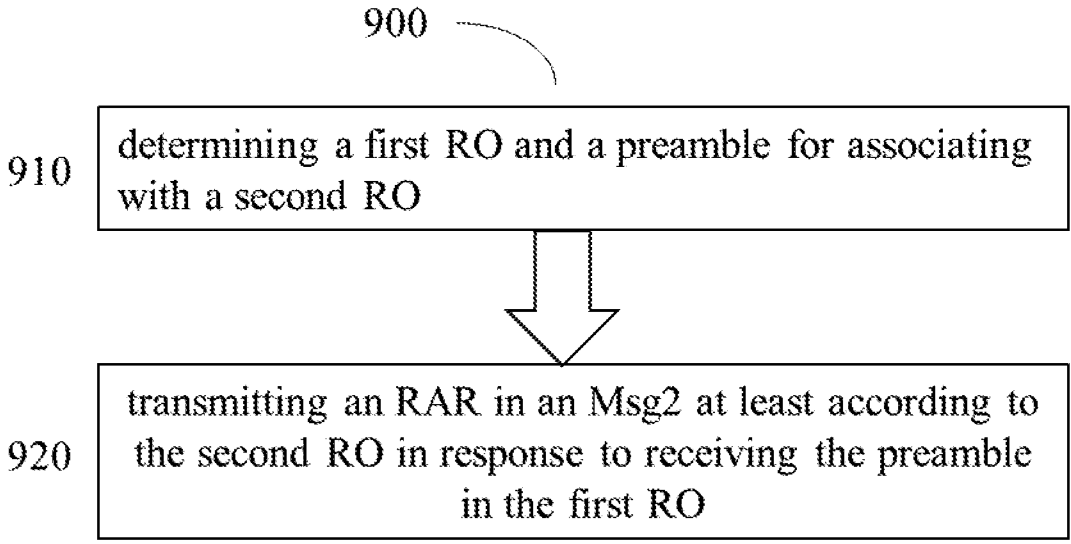
FIG. 9 illustrates an exemplary method according to some embodiments of the present disclosure.

FIG. 9 shows an exemplarily method 900 performed by a BS according to some embodiments of the present disclosure.

As shown in FIG. 9, the method 900 at least includes an operation 910 and an operation 920. The operation 910 illustrates determining an association among a first RO, a preamble, and a second RO, and the operation 920 illustrates transmitting an RAR in an Msg2 at least according to the second RO in response to receiving the preamble in the first RO from a UE.

In some embodiments, before or during receiving the preamble in the first RO, the association among the first RO, the preamble, and the second RO is determined. In some embodiments, after receiving the preamble in the first RO and before transmitting the RAR, the association among the first RO, the preamble, and the second RO is determined.

In some embodiments, the determination of the association among the first RO, the preamble, and the second RO may be decomposed into the determination of the association between the first RO and the preamble, and the determination of the association between the first RO and the second RO.

In some embodiments, the first RO is configured for a first type of UEs, the second RO is configured for a second type of UEs, the UE belongs to the first type of UEs, and the second RO is not earlier than the first RO in a time domain. For example, the first type of UEs can be RedCap UEs or coverage enhanced UEs, and the second type of UEs can be legacy UEs.

In some embodiments, the ROs for the first type of UEs (i.e., the first type of ROs) are separated from the ROs for the second type of UEs (i.e., the second type of ROs). In other words, the first type of ROs is not used by the second type of UEs, and vice versa.

In some embodiments, the determination of the association between the first RO and the second RO is performed at least according to an SSB. The SSBs are shared by the first type of UEs and the second type of UEs. In other words, the first type of ROs may be associated with the SSBs, and the second type of ROs may be associated with the SSBs as well.

In some embodiments, the first RO and the second RO are associated with the same SSB.

In some embodiments, based on the association between the SSB and the first type of ROs, the association between the SSB and the second type of ROs, the association between the preamble and the first type of ROs, the BS determines the association among the first RO, the preamble, and the second RO. In the operation 920, the BS receives a preamble in the first RO, based on the association among the preamble, the first RO, and the second RO, the BS transmits an RAR in an Msg2 at least according to the second RO.

The association of ROs for a type of UEs and SSBs could be 1-to-1, 1-to-N, or N-to-1 depending on network configuration, wherein N is a positive integer greater than 1.

In some embodiments, in the operation 910, multiple ROs in the second type of ROs can be associated with the SSB, which requires one of them to be determined as the second RO.

In some embodiments, the second RO is an RO configured with a lowest or highest or predetermined or configured (configured by the UE or the BS) frequency domain position and a lowest time domain position among at least one second type of RO associated with the SSB.

In some embodiments, the association between the SSBs and the ROs are performed periodically.

In some embodiments, in the operation 910, the determination of the first RO for associating with the second RO at least according to the SSB is performed periodically in a RO association period. In some embodiments, the RO association period can be configured by the UE, or a BS, or a network, or can be predefined.

In some embodiments, the RO association period is determined at least according to a first period and/or a second period. The first period is for associating the first RO with the SSB, and the second period is for associating the second RO with the SSB. In some embodiments, the first period can be configured by the UE, or a BS, or a network, or can be predefined.

In some embodiments, the first period is equal to the second period multiplied with a first factor, and the first factor is a positive number. In some embodiments, the first factor can be configured by the UE or a BS or can be predefined.

In some embodiments, the RO association period is determined as a larger period between the first period and the second period and multiplied with a second factor, and the second factor is a positive number. In some embodiments, the second factor can be configured by the UE or a BS or can be predefined.

As aforementioned, in the operation 910 of FIG. 9, there may be multiple ROs in the second type of ROs associated with the SSB, and thus one of them needs to be determined as the second RO.

In some cases, for example, each RO is associated with one SSB (or beam), and the ROs configured for the first type of UEs are sparser than the ROs configured for the second type of UEs. If there is only one second type RO in the frequency domain that is associated with the SSB, then the two ROs of two type are associated correspondingly. If there are two or more second type ROs in the frequency domain that are associated with the SSB, then the second type RO configured with the lowest (or highest) or a predefined/configured frequency domain position and with the lowest time domain position is selected for the association. In other words, the second RO is the nearest RO to the first RO among the second type of ROs that are not earlier than the first RO in the time domain and are associated with the same SSB.

In some cases, for example, each first type RO is associated with multiple SSBs, while each second type RO is associated with only one SSB. In such cases, the first RO is associated with a set of nearest second type ROs that are not earlier than the first RO and are associated with multiple SSBs. Which one of this set of nearest second type ROs is determined to be the second RO depends on which SSB is selected for receiving the preamble.

In some cases (maybe not that typical), for example, each SSB is associated with one first type RO and one second type RO in a frequency domain, each first type RO is associated with only one SSB, while each second type RO is associated with multiple SSBs, or for example, the first type of ROs are configured denser than the second type of ROs, then a set of first type ROs may be associated with a same second type RO. In such cases, only the association between the first one out of this set of first type ROs in the time domain and the second type RO is maintained, while the association between any one of other ROs in this set of first type ROs and the second type RO is dropped and not used for an RAR transmission. In other words, the first one out of this set of first type ROs in the time domain is determined to be the first RO for associating with the second type RO.

In some embodiments, in the operation 920, the Msg2 is scheduled by a DCI with a scrambling sequence at least according to the second RO.

According to the present application, the first type of UEs and the second type of UEs share the same Msg2. In other words, an Msg2 may contain RARs for the first type of UEs and RARs for the second type of UEs.

In some embodiments, the RA-RNTI for the Msg2 PDCCH is determined by the time and frequency position of the second RO.

In some embodiments, the operation 920 further includes placing a MAC subPDU including the RAR after a last MAC subPDU for the second type of UEs in the Msg2, and the MAC subPDU is treated as padding bits by the second type of UEs.

In some embodiments, the MAC subPDUs for the first type of UEs are placed after the last MAC subPDU for the second type of UEs in the Msg2.

In some embodiments, a MAC subPDU for the RAR of the first type of UEs may be designed to be in a new form so as to be unable to be identified by the second type of UEs.

For example, the operation 920 may further include placing an indicator in a MAC subPDU for the RAR, the indicator may indicate that the MAC subPDU for the RAR is for the first type of UEs, and the MAC subPDU is not identified by the second type of UEs. As an embodiment, the indicator may indicate a repetition number for Msg3 transmission. As another embodiment, the indicator may indicate the RO index of a first type of RO when multiple first type of ROs are associated with one second type of RO.

According to the present disclosure, the advantages of the ROs separation between different type of UEs may be kept; and as the ROs of the different type of UEs may be associated with each other, so that different types of UEs may share the same Msg2, accordingly, the increase of the Msg2 overhead, including PDCCH and PDSCH overhead, may be avoided, and the aforementioned negative effects due to the ROs separation may be avoided.

For example, the first type of UEs can be RedCap UEs, coverage enhanced UEs, or other existing type of UEs, or can be other type of UEs created in the further, and the second type of UEs can be legacy UEs. According to the present disclosure, as the first type of UEs share the Msg2 of the legacy UEs, although the ROs of the two types of UEs are separated, the whole Msg2 overhead may not be increased.

In addition, the MAC subPDU including the RAR for the first type of UEs are treated as padding bits or cannot be identified by the legacy UEs; therefore, even the first type of UEs share the Msg2 with the legacy UEs, the first type of UEs do not affect the RAR reception of the legacy UEs.

The spirit of the present disclosure is not limited to the various embodiments, examples, and methods mentioned previously. On the basis of not violating the inventive spirit of the present invention, the above various embodiments in the present invention can be reasonably extended.

For example, the association between the two different types of ROs for the two different types of UEs may be set up at least according to other parameters, factors, and/or configurations.

For example, the association between more types of ROs for more different type of UEs may be set up at least according to a parameter, a factor, a configuration, and etc., for example, the SSB.

Figure 10:
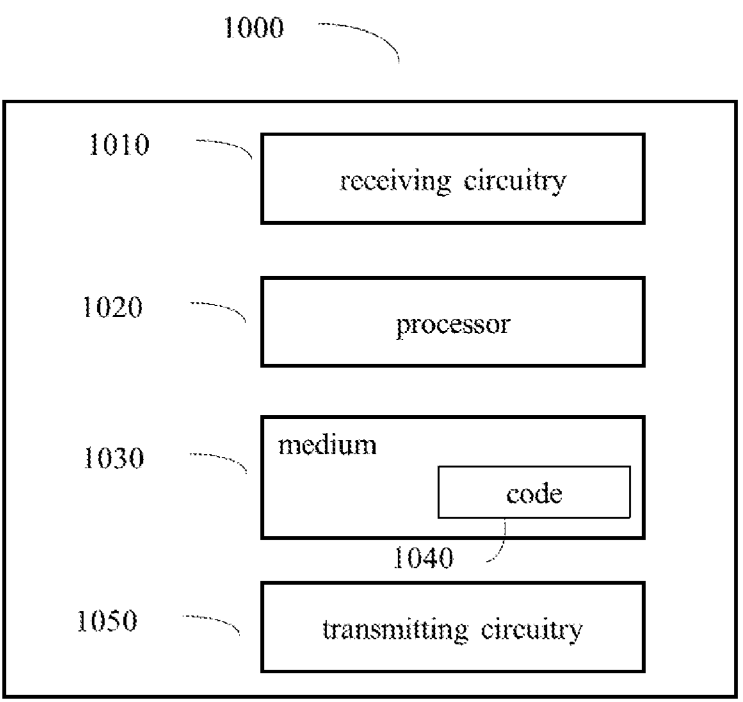
FIG. 10 illustrates an example apparatus according to some embodiments of the present disclosure.

FIG. 10 illustrates an example apparatus 1000 for performing the method 100, which, for example, may be at least a part of a UE.

As shown in FIG. 10, the apparatus 1000 may include at least one receiving circuitry 1010, at least one processor 1020, at least one non-transitory computer-readable medium 1030 with computer-executable 1040 stored thereon, and at least one transmitting circuitry 1050. The at least one medium 1030 and the computer program code 1040 may be configured to, with the at least one processor 1020, cause the apparatus 1000 at least to perform at least the example method 800 described above, wherein, for example, the apparatus 1000 may be the UE in the example method 100.

Figure 11:
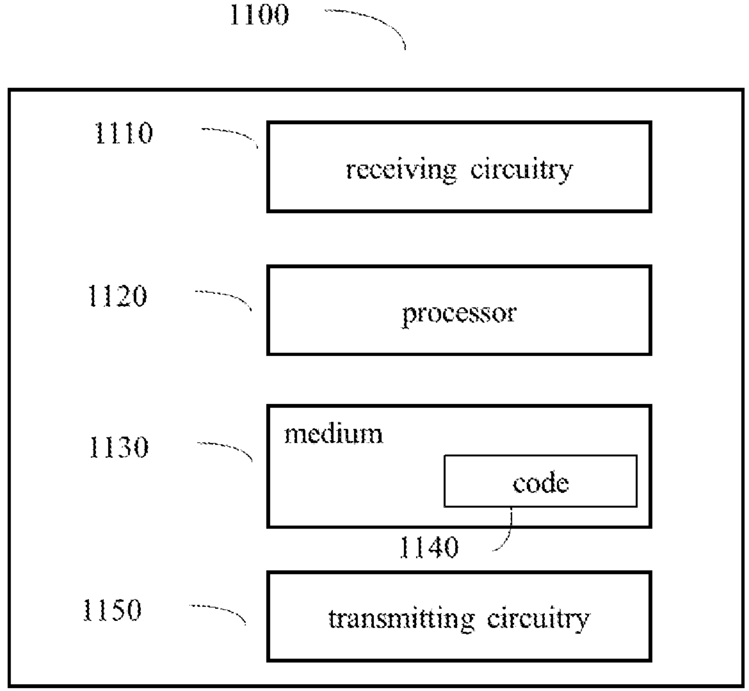
FIG. 11 illustrates an example apparatus according to some embodiments of the present disclosure.

FIG. 11 illustrates an example apparatus 1000 for performing the method 900, which, for example, may be at least a part of a BS.

As shown in FIG. 11, the apparatus 1100 may include at least one receiving circuitry 1110, at least one processor 1120, at least one non-transitory computer-readable medium 1130 with computer-executable 1140 stored thereon, and at least one transmitting circuitry 1150. The at least one medium 1130 and the computer program code 1140 may be configured to, with the at least one processor 1120, cause the apparatus 1100 at least to perform at least the example method 900 described above, wherein, for example, the apparatus 1100 may be the BS in the example method 900.

In various example embodiments, the at least one processor 1020 or 1120 may include, but not limited to, at least one hardware processor, including at least one microprocessor such as a CPU, a portion of at least one hardware processor, and any other suitable dedicated processor such as those developed based on for example Field Programmable Gate Array (FPGA) and Application Specific Integrated Circuit (ASIC). Further, the at least one processor 1020 or 1120 may also include at least one other circuitry or element not shown in FIG. 10 or 11.

In various example embodiments, the at least one medium 1030 or 1130 may include at least one storage medium in various forms, such as a volatile memory and/or a non-volatile memory. The volatile memory may include, but not limited to, for example, an RAM, a cache, and so on. The non-volatile memory may include, but not limited to, for example, an ROM, a hard disk, a flash memory, and so on. Further, the at least medium 1030 or 1130 may include, but are not limited to, an electric, a magnetic, an optical, an electromagnetic, an infrared, or a semiconductor system, apparatus, or device or any combination of the above.

Further, in various example embodiments, the example apparatus 1000 or 1100 may also include at least one other circuitry, element, and interface, for example antenna element, and the like.

In various example embodiments, the circuitries, parts, elements, and interfaces in the example apparatus 1000 or 1100, including the at least one processor 1020 or 1120 and the at least one medium 930 or 1030, may be coupled together via any suitable connections including, but not limited to, buses, crossbars, wiring and/or wireless lines, in any suitable ways, for example electrically, magnetically, optically, electromagnetically, and the like.

The methods of the present disclosure can be implemented on a programmed processor. However, controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device that has a finite state machine capable of implementing the flowcharts shown in the figures may be used to implement the processing functions of the present disclosure.

While the present disclosure has been described with specific embodiments thereof, it is evident that many alternatives, modifications, and variations will be apparent to those skilled in the art. For example, various components of the embodiments may be interchanged, added, or substituted in other embodiments. Also, all of the elements shown in each figure are not necessary for operation of the disclosed embodiments. For example, one skilled in the art of the disclosed embodiments would be capable of making and using the teachings of the present disclosure by simply employing the elements of the independent claims. Accordingly, the embodiments of the present disclosure as set forth herein are intended to be illustrative, not limiting. Various changes may be made without departing from the spirit and scope of the present disclosure.

In this disclosure, relational terms such as "first," "second," "$1^{st}$," "$2^{nd}$," and the like may be used solely to distinguish one entity or action from another entity or action without necessarily requiring or implying any actual such relationship or order between such entities or actions.

In this disclosure, a first type of ROs are for the first type of UEs. An RO of the first type of ROs has the same meaning as a first type RO.

In this disclosure, a second type of ROs are for the second type of UEs. An RO of the second type of ROs has the same meaning as a second type RO.

The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed is:

1. An apparatus, comprising:

a memory; and a processor coupled to the memory, the processor configured to cause the apparatus to:

determine an association among a first random access channel (RACH) occasion (RO), a preamble, and a second RO, wherein to determine the association among the first RO, the preamble, and the second RO, the processor is configured to cause the apparatus to determine an association between the first RO and the second RO at least according to a synchronization signal block (SSB), wherein the first RO is configured for a first type of user equipment (UE), the second RO is configured for a second type of UE, the apparatus comprises a UE that belongs to the first type of UE, and the second RO is not earlier than the first RO in a time domain; and receive a random access response (RAR) in an Msg2 at least according to the second RO in response to transmitting the preamble in the first RO.

2. The apparatus of claim 1, wherein the Msg2 is scheduled by a Downlink Control Information (DCI) with a scrambling sequence at least according to the second RO.

3. The apparatus of claim 1, wherein:

the second RO comprises an RO configured with:

one or more of a lowest frequency domain position, a highest frequency domain position, a predetermined frequency domain position, or a configured frequency domain position; and a lowest time domain position among at least one RO associated with the SSB among at least one RO for the second type of UE.

4. The apparatus of claim 1, wherein to receive the RAR in the Msg2 at least according the second RO, the processor is configured to cause the apparatus to:

determine a random access (RA) response window for the Msg2 at least according to the second RO.

5. The apparatus of claim 1, wherein to determine the association among the first RO, the preamble, and the second RO, the processor is configured to cause the apparatus to:

determine the association among the first RO, the preamble, and the second RO periodically in an RO association period, wherein the RO association period is configured by one or more of a UE, a base station (BS), a network, or is predefined.

6. The apparatus of claim 5, wherein the RO association period is determined at least according to one or more of a first period or a second period, and wherein the first period is configured for associating the first RO with the SSB, the second period is configured for associating the second RO with the SSB, and wherein the first period is configured by one or more of the UE, the BS, the network, or is predefined.

7. The apparatus of claim 6, wherein the first period is equal to the second period multiplied with a first factor, and wherein the first factor is a positive number and is configured by one or more of the UE, the BS, or is predefined.

8. The apparatus of claim 6, wherein the RO association period is determined as a larger period between the first period and the second period and multiplied with a second factor, wherein the second factor is a positive number and is configured by one or more of the UE, the BS, or is predefined.

9. The apparatus of claim 1, wherein a medium access control (MAC) sub protocol data unit (subPDU) for the RAR is placed after a last MAC subPDU for the second type of UE in the Msg2 and is treated as padding bits by the second type of UE.

10. The apparatus of claim 1, wherein a medium access control (MAC) sub protocol data unit (subPDU) for the RAR includes an indicator indicating that the MAC subPDU for the RAR is for the first type of UE, and the MAC subPDU is not identified by the second type of UE.

11. An apparatus, comprising:

a memory; and a processor coupled to the memory, the processor configured to cause the apparatus to:

determine an association among a first random access channel (RACH) occasion (RO), a preamble, and a second RO, wherein to determine the first RO for associating with the second RO, the processor is configured to cause the apparatus to determine the first RO for associating with the second RO at least according to a synchronization signal block (SSB), wherein the first RO is configured for a first type of UE, the second RO is configured for a second type of UE, the UE belongs to the second type of UE, and the second RO is not earlier than the first RO in a time domain; and transmit a random access response (RAR) in an Msg2 at least according to the second RO in response to receiving the preamble in the first RO from a user equipment (UE).

12. The apparatus of claim 11, wherein to determine the association among the first RO, the preamble, and the second RO, the processor is configured to cause the apparatus to:

determine the association among the first RO, the preamble, and the second RO at least according to the SSB periodically in an RO association period, wherein the RO association period is configured by one or more of the UE, a base station (BS), a network, or is predefined.

13. The apparatus of claim 11, wherein the Msg2 is scheduled by a Downlink Control Information (DCI) with a scrambling sequence at least according to the second RO.

14. The apparatus of claim 11, wherein:

the second RO comprises an RO configured with:

one or more of a lowest frequency domain position, a highest frequency domain position, a predetermined frequency domain position, or a configured frequency domain position; and a lowest time domain position among at least one RO associated with the SSB among at least one RO for the second type of UE.

15. The apparatus of claim 11, wherein a medium access control (MAC) sub protocol data unit (subPDU) for the RAR is placed after a last MAC subPDU for the second type of UE in the Msg2 and is treated as padding bits by the second type of UE.

16. A method, comprising:

determining, by a user equipment (UE), an association among a first random access channel (RACH) occasion (RO), a preamble, and a second RO, wherein determining the association among the first RO, the preamble, and the second RO further comprises determining an association between the first RO and the second RO at least according to a synchronization signal block (SSB), wherein the first RO is configured for a first type of UE, the second RO is configured for a second type of UE, the UE belongs to the first type of UE, and the second RO is not earlier than the first RO in a time domain; and receiving a random access response (RAR) in an Msg2 at least according to the second RO in response to transmitting the preamble in the first RO.

17. The method of claim 16, wherein the Msg2 is scheduled by a Downlink Control Information (DCI) with a scrambling sequence at least according to the second RO.

18. The method of claim 16, wherein:

the second RO is an RO configured with a lowest or highest or predetermined or configured frequency domain position and a lowest time domain position among at least one RO associated with the SSB among at least one RO for the second type of UE.

19. The method of claim 16, wherein receiving the RAR in the Msg2 at least according the second RO further comprises:

determining a random access (RA) response window for the Msg2 at least according to the second RO.

20. The method of claim 16, wherein determining the association among the first RO, the preamble, and the second RO further comprises:

determining the association among the first RO, the preamble, and the second RO periodically in an RO association period, wherein the RO association period is configured by one or more of the UE, a base station (BS), a network, or is predefined.

* * * * *